Figure 2:
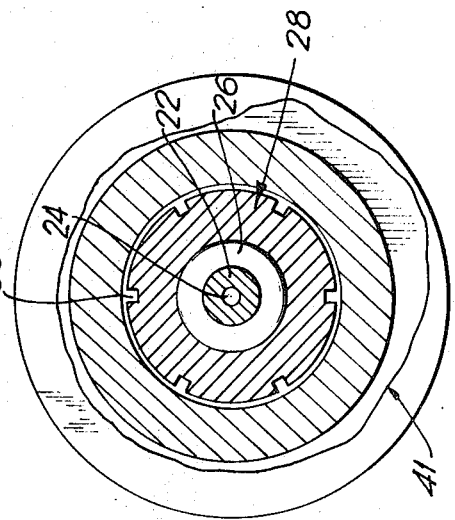

United States Patent

[11] 3,542,062

[72] Inventors Abduz Zahid;
 Alphonse A. Jacobellis, Los Angeles, California
[21] Appl. No. 734,953
[22] Filed June 6, 1968
[45] Patented Nov. 24, 1970
[73] Assignee Greer Hydraulics Inc.
 Los Angeles, California
 a corporation of New York

[54] GAS-CHARGING AND RELIEF VALVE ASSEMBLY
 4 Claims, 2 Drawing Figs.
[52] U.S. Cl. ............................................. 137/512.3,
 137/226, 137/538, 137/543.15
[51] Int. Cl. ............................................. F16k 17/00
[50] Field of Search ........................................ 137/115,
 116, 116.3, 226, 230, 493, 512.3,
 538, 543.15; 141/95, 96

[56] References Cited
UNITED STATES PATENTS
| 1,156,328 | 10/1915 | Thayer | 137/226 |
| 1,216,919 | 2/1917 | Ashelman et al. | 137/226 |
| 1,363,623 | 12/1920 | Smith | 137/543.15X |
| 2,086,236 | 7/1937 | Peo et al. | 137/543.15X |
| 3,450,147 | 6/1969 | Webb | 137/226 |

FOREIGN PATENTS
| 737,198 | 9/1955 | Great Britain | 137/512.3 |

Primary Examiner—William F. O'Dea
Assistant Examiner—David J. Zobkiw
Attorney—Arthur B. Colvin ABSTRACT: This invention relates to an integral valve assembly which will permit charging of a pressure vessel with gas under pressure and which incorporates a relief valve that will relieve the pressure in the pressure vessel when it exceeds a predetermined amount.

Patented Nov. 24, 1970

3,542,062

INVENTORS
ABDUZ ZAHID
ALPHONSE A. JACOBELLIS
BY

ATTORNEY ly mounted in the casing bore. The piston is spring urged
GAS-CHARGING AND RELIEF VALVE ASSEMBLY As conducive to an understanding of the invention, it is noted that where a pressure vessel is charged with gas under pressure through a conventional one-way valve, the flow of such gas into the pressure vessel must be carefully monitored to insure that it does not exceed a predetermined value to prevent bursting of the pressure vessel being charged.

Where the pressure vessel is charged to a predetermined pressure and the pressure should then rise due, for example, to an increase in the ambient temperature or a pressure surge in the system in which the pressure vessel is incorporated, unless suitable pressure relief valve means are associated with the pressure vessel or the system in which it is employed, rupture of the pressure vessel or the pressure lines of the system may occur.

Since the pressure vessel normally has a port in which the conventional charging valve is mounted, where an additional pressure relief valve is provided which necessitates a separate and distinct assembly and an additional opening in the pressure vessel in which it must be mounted, the installation of the pressure relief valve adds materially to the cost of the equipment.

It is accordingly among the objects of the invention to provide a gas-charging and pressure relief valve assembly which may be incorporated into a single casing and which has relatively few parts which may readily be fabricated at low cost and which may readily be adjusted to provide for pressure relief at a predetermined value.

According to the invention, the assembly comprises a casing having a bore therethrough of reduced diameter at one end defining the outlet port of the assembly. A valve member in the form of a piston having an axial bore therethrough is slidably mounted in the casing bore. The piston is spring urged toward the end of the casing having the outlet port so that an annular seal carried by the piston will normally cut off communication between said outlet port and a relief port in the wall of the casing.

A gas-charging valve is mounted in the end of the casing bore remote from the outlet port, the gas flowing through the piston bore and outlet port into the pressure vessel to be charged, even when the piston cuts off communication between the outlet port and the relief port.

Figure 1:
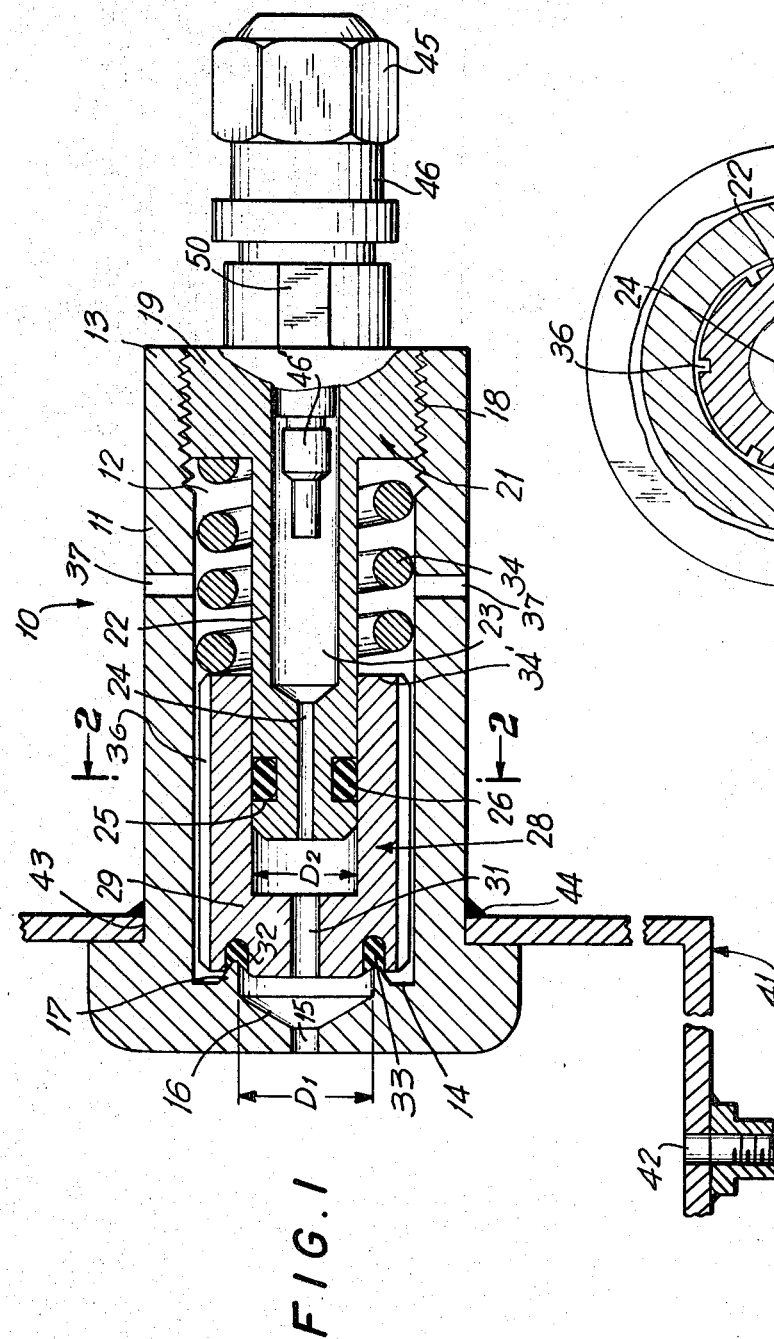

In the accompanying drawings in which are shown one of various possible embodiments of the several features of the invention:

FIG. 1 is a longitudinal sectional view of the assembly; and
FIG. 2 is a transverse sectional view taken along line 2-2 of FIG. 1.

Referring now to the drawings, the valve 10 comprises a casing or body portion 11 having a cylindrical bore 12 extending from the mouth 13 of the casing 11 to the transverse floor 14 thereof.

The floor 14 has an axial bore 15 therethrough of relatively small diameter as compared to the diameter of bore 12 and which leads into a frustoconical cavity 16 in the inner surface of said floor. The periphery of said cavity 16 has an inwardly extending annular rim 17 which defines a valve seat.

The mouth 13 of the casing 11 is internally threaded as at 18 and receives a closure member 19 which illustratively is the correspondingly threaded head 19 or a guide member 21 which has a reduced diameter cylindrical stem 22 extending into bore 12.

The head 19 and stem 22 have an axial bore 23 therethrough which is of reduced diameter as at 24 at the inner end portion of the stem. The stem 22 at its inner end has an annular groove 25 in its periphery in which an O-ring 26 is positioned.

Slidably mounted on the stem 22 and encompassing the O-ring is a valve member in the form of a hollow piston 28 which has a floor 29 at its inner end with an axial bore 31 therethrough aligned with the bore 15 in the floor 14 of the body portion 11 and the reduced diameter portion 24 of bore 23.

The outer surface of floor 29 of the piston 28 has an annular groove 32 in which a resilient member 33 such as a washer is secured, said resilient member being aligned with the annular rim 17. The resilient member 33 is normally retained against the rim 17 by a coil spring 34 compressed between the end 34' of the piston 28 and the head portion 19 of guide member 21.

The periphery of the piston 28 has a plurality of spaced longitudinal grooves 36 therein, and relief ports 37 are provided in the casing 11 leading into the bore 12 thereof.

The gas-charging and relief valve assembly above described may be utilized with any suitable pressure vessel such as a gas reservoir 41 having an outlet port 42 to which a suitable line (not shown) may be connected.

The assembly 10 is secured in an opening 43 in the wall of the reservoir 41 as by welding at 44.

To charge the pressure reservoir, the cap 45 is removed and a source of gas under pressure is connected to the protruding end 46 of the guide member 21.

The gas under pressure will flow through a conventional one-way valve 46' such as a Shraeder valve, positioned in the bore 23 of guide member 21 and then through the aligned bores 24 and 31 and outlet port 15 into the reservoir 41 to charge the latter. When the reservoir has been charged to a desired amount, the source of gas under pressure is discontinued from protruding portion 46 and the cap 45 screwed in position.

As the area $D_1$ of the outer surface of the floor of the piston 28 subjected to the pressure in reservoir 41 is greater than the area $D_2$ of the inner surface of the floor of the piston, since both surfaces are subjected to the same pressure, the differential pressure would normally tend to move the piston 28 away from the valve seat defined by annular rim 17.

However, due to the force exerted by coil spring 34, the piston will normally remain seated until the pressure has built up sufficiently so that the force exerted against the piston to move it off its seat will overcome the force exerted by the coil spring 34.

When the piston is moved away from its seat 17, a path for escape of the gas under pressure in the pressure reservoir 41 will be provided through port 15, grooves 36 in piston 28 and relief ports 37.

The force exerted by spring 34 may be varied by adjusting the position of head 19 of guide member 21. This may readily be accomplished by applying a wrench, for example, to the flats 50 on the protruding end 46 of the guide member and rotating the latter.

The assembly 10 above described may, for example, have the relief pressure set at 4,000 p.s.i. for a 2,000 p.s.i. working pressure. Thus, when the reservoir is initially being charged, while gas under pressure is flowing through valve 46' into the reservoir, if the charging pressure should rise above 4,000 p.s.i., the piston would move off its seat 17 to bleed the reservoir.

Pressure relief will also be provided when the pressure reservoir is being used for its intended purpose, to take care of pressure surges in the system or buildup of pressure due to temperature increase.

We claim:
1. A fluid-charging and relief valve assembly comprising a casing having a bore therethrough defining a mouth at one end, the end of said casing remote from the mouth thereof having a transverse floor with an axial bore defining an outlet port, said floor having an inwardly extending annular rim on its inner surface, coaxial with said outlet port and defining a valve seat, said casing having a relief port leading into the bore thereof, a valve member comprising a piston slidably mounted in said casing bore, said piston having a transverse floor at the end thereof adjacent said outlet port, said floor defining the end wall of said piston, said end wall being movable against and away from said annular rim, means normally urging said piston against said annular rim to cut off communication between said outlet port and said relief port, a closure member comprising a head threadably mounted in the mouth of said casing bore, said head having an inwardly extending axial guide stem, the inner end of said stem being longitudinally spaced from said outlet port, the head and said stem of said closure member having an axial bore therethrough, a fluid charging valve mounted in said closure member bore at its outer end, said piston having an axial bore therethrough providing communication between said fluid-charging valve and said outlet port, the portion of said piston bore extending through the floor of the piston being of reduced diameter, the area of the inner surface of said floor of the piston exposed to the fluid pressure in said outlet port being less than the area of the outer surface of said floor of the piston exposed to the fluid pressure in said outlet port, the inner end of said stem extending into the larger diameter portion of the piston bore slidably to mount said piston whereby when the fluid pressure in said outlet port exceeds a predetermined amount, the valve member will be moved away from its seat to provide communication between said outlet port and said relief port.

2. The combination set forth in claim 1 in which the means normally urging said piston against said annular rim comprises a coil spring encompassing said stem and compressed between opposed surfaces of said head and said piston to urge said piston toward said annular rim.

3. The combination set forth in claim 1 in which the piston has longitudinal passage means in its outer periphery and said casing bore has said relief port leading thereinto in the portion thereof between the head of said closure member and the piston, said longitudinal passage means providing communication between said outlet port and said relief port when said piston is moved off its seat.

4. The combination set forth in claim 1 in which the inner end of said stem has an annular groove in its outer periphery and an O-ring is positioned in said annular groove to provide a seal with respect to the wall surface of said piston bore encompassing said O-ring.